United States Patent [19]
Radke et al.

[11] 3,822,911
[45] July 9, 1974

[54] CONVERTIBLE SEAT, SUPPORT PLATFORM AND STORAGE COMPARTMENT FOR MOTOR VEHICLE

[75] Inventors: Arthur O. Radke, Milwaukee; Shawn H. Eimen, Cudahy, both of Wis.

[73] Assignee: Universal Oil Products Company, Des Plaines, Ill.

[22] Filed: Nov. 24, 1972

[21] Appl. No.: 309,570

[52] U.S. Cl.............................. 296/66, 5/29, 5/58, 296/24 R, 297/109
[51] Int. Cl............................................. B60n 1/10
[58] Field of Search........ 296/23 R, 24 R, 65 R, 66, 296/69; 5/38, 42, 29, 58; 297/108, 109, 110

[56] References Cited
UNITED STATES PATENTS

| | | | |
|---|---|---|---|
| 1,539,764 | 5/1925 | Page.................................. | 296/24 R |
| 1,836,315 | 12/1931 | Druyun.................................... | 5/42 |
| 1,894,103 | 1/1933 | Kuenzel........................... | 296/69 X |
| 2,136,972 | 11/1938 | Graunke........................... | 296/24 R |
| 2,232,353 | 2/1941 | Votypka............................ | 296/24 R |
| 2,916,325 | 12/1959 | Estes et al............................. | 296/66 |
| 2,937,383 | 5/1960 | Rehfeld............................... | 5/58 X |
| 2,956,837 | 10/1960 | Koplin.................................. | 296/66 |
| 3,246,347 | 4/1966 | Mason............................. | 296/69 X |
| 3,738,699 | 6/1973 | Fain................................... | 296/23 R |

FOREIGN PATENTS OR APPLICATIONS

| | | | |
|---|---|---|---|
| 419,329 | 11/1934 | Great Britain...................... | 296/66 |

*Primary Examiner*—Robert G. Sheridan
*Assistant Examiner*—Leslie J. Paperner
*Attorney, Agent, or Firm*—James R. Hoatson, Jr.; Barry L. Clark; William H. Page, II

[57] ABSTRACT

Convertible seats for a van-type motor vehicle is attached to the vehicle in such a way that it may be easily removed when desired. The unit includes a base portion for supporting a seat cushion and rearwardly extending upright side portions. The side portions are connected at their upper edges by top and front wall portions which cooperate with a rear seat cushion attached to the front of the uprights below the front wall portion to define a storage compartment behind the seat. The front seat cushion is pivotally mounted to the base so that it may be flipped forwardly to define a flat support platform. A two sectioned rear flat support platform is also pivotally mounted behind the rear seat cushion in such a way that the rear support sections can be held in a generally vertical position when not being used, thus permitting the storage compartment to accommodate tall articles. Alternatively, the rear sections can be placed in a horizontal position with the rear section either being folded under the front section or extended outwardly therefrom to provide a shallow or deep lower shelf in the storage compartment. All of the support surfaces are on the same level so that when the seat back is removed the front and rear support platforms can be used together to support long items or to form a flat base suitable for supporting a mattress and bedding. The various front and rear support surfaces are usable independently, irrespective of whether or not the rear seat cushion is in position separating the front and rear portions of the unit.

5 Claims, 5 Drawing Figures

PATENTED JUL 9 1974　　　　　　　　　　　　　　　　3,822,911

CONVERTIBLE SEAT, SUPPORT PLATFORM AND STORAGE COMPARTMENT FOR MOTOR VEHICLE

SUMMARY

This invention relates to convertible seats for vehicles and especially to a seat which may be converted into a support for long items or for sleeping purposes.

It is an object of this invention to provide a seating structure which is convertible into a flat supporting surface which may be used by itself or in combination with folding elements positioned behind the seat to provide an enlarged support surface when the seat back which divides the front and rear support areas is removed.

It is another object of this invention to provide a seating unit for a van-type vehicle which combines in a single removable unit, a seat and a storage compartment behind the seat which has its front wall defined by the rear cushion of the seat, and wherein the rear cushion is removable to provide acess to the rear storage compartment.

These and other objects are attained by the present invention which combines both seating and storage capability in a single unit which may be readily attached to or removed from the vehicle. The improved seating and storage unit comprises two vertical wall portions, an interconnecting flat portion which defines a base for a seat cushion positioned at the front of the unit and an interconnecting top portion which covers an open backed storage compartment positioned at the rear of the unit. The upright portions, which may be made of a material such as plywood or particle board, support a fixed headrest portion and a removable back rest cushion member which define the front wall of the storage compartment. The unit includes several folding members which may be folded independently of each other depending upon the use to which the structure is to be put. A seat cushion member having a flat bottom surface is pivoted at its lower front edge to the upper front edge of the flat seat base portion so that it may be flipped forwardly and upside down. In its forward position it rests on the floor on built-in legs to provide a flat support surface coextensive with the flat seat portion. The top of the seat base and the bottom of the seat cushion may be covered with a material such as carpeting so as to form a surface upon which children can play or which will resist the sliding movement of articles stored thereon. Pivoted to the rear of the seat base and behind the back rest cushion is a hinged, two-sectioned support platform preferably made of thin material such as plywood or particle board. The rear platform is adapted to be pivoted upwardly so as to rest against the back of the seat cushion when not in use. The rear section is pivoted at its forward edge to the front section so as to hang down in overlapping relation and forwardly of the forward section when stored. The two rear sections are preferably covered with carpeting for the same purpose as the front sections. The two rear sections can be positioned in overlapped relation in a horizontal position so as to form a short depth rear shelf in the storage compartment or the rear section may be pivoted outwardly so as to lie in the same plane as the front section to provide a long depth support shelf in the rear compartment. The arrangement of the rear storage support sections permits cargo such as suitcases to be arranged in separate layers or to be spaced on an even surface deck above irregular shaped items stored beneath the deck. When the rear support platform sections are folded to their generally vertical storage position behind the rear cushion, the storage compartment will accept tall items. Furthermore, the carpeting on the support platform will be protected when dirty items such as a lawn mower, shrubbery, or bags of cement are being carried in the rear compartment. When the rear seat cushion is removed, the front storage platform defined by the seat base and the folded over seat cushion can cooperate with the rear two sectioned support platform to provide a long flat platform suitable for receiving a mattress and bedding to permit sleeping or to carry long items such as skis and fishing poles.

DESCRIPTION OF THE PREFERRED EMBODIMENT

Figure 1:
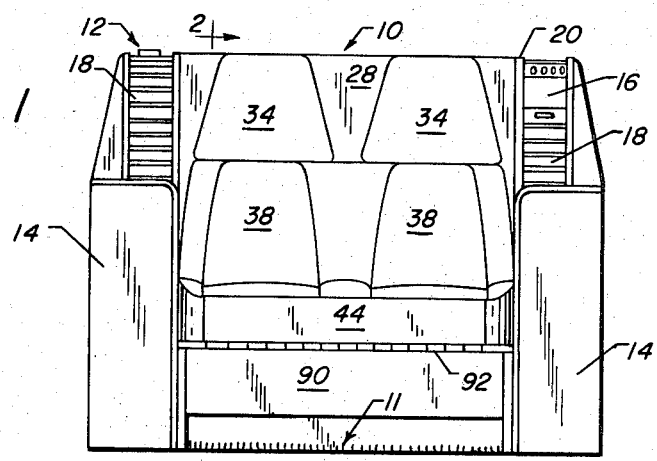
FIG. 1 is a front plan view showing the convertible seat and support platform unit in combination with vehicle mounted storage compartments.

Referring to FIG. 1, a convertible seat and storage platform unit indicated generally at 10 is shown resting on the floor 11 of a van-type vehicle (not shown). The unit 10 is adapted to be easily mounted in or unmounted from a vehicle by moving it through the vehicle's rear doors (not shown) from between the side storage units indicated generally at 12. The side units 12 are spaced from each other by a distance no greater than the rear door opening clearance and comprise forward cabinet sections 14 and rearward clothes compartments 16 having doors 18, for hanging clothing. The unit 10 has a pair of vertical side portions or walls 20 which may be removably anchored by screws 24 to vertical wall members 22 of the side units 12. The side portions 20 are shown as solid members but could also comprise open metal frame work.

Figure 2:
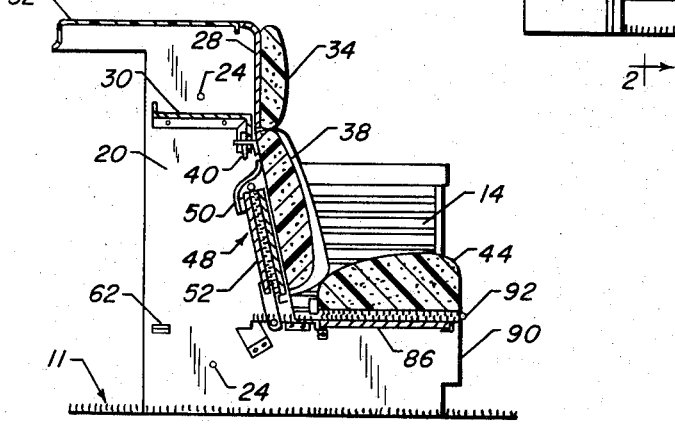
FIG. 2 is a side sectional view taken on line 2—2 of FIG. 1.

The vertical side wall member 20 are spaced from each other by a front upper wall member 28, an upper rear shelf unit 30 and a top member 32. The upper front wall member 28 carries fixed headrest portion 34 thereon. A seat back cushion member 38 is locked along its upper rear edge to the upper shelf unit 30 by locking pins 40. A seat cushion member 44 completes the seating configuration of the unit shown in FIG. 2.

Figure 3:
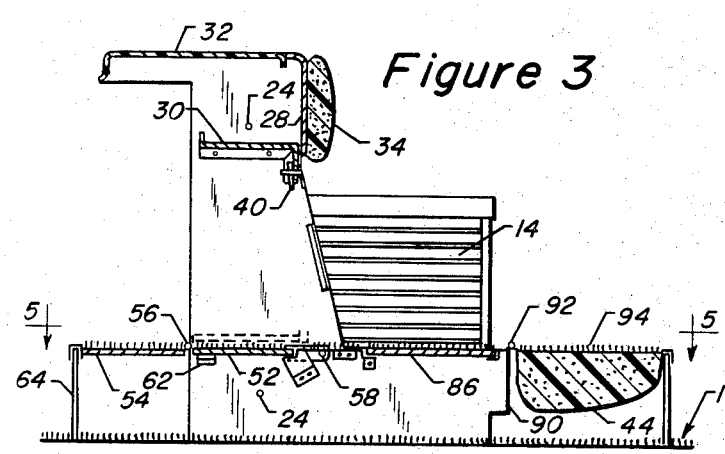
FIG. 3 is a side sectional view similar to FIG. 2 but showing the unit in its support configuration.

Positioned behind the seat back cushion 38 is a rear storage platform indicated generally at 48 which may be held in a generally vertical storage position when its use is not required by means of a flexible fastener 50 which may comprise a hook and loop-type fastener of the type sold under the trademark Velcro. The rear storage platform 48 comprises a forward section 52 and a rearward section 54 hinged to the forward section by hinge means 56. A pair of hinge members 58 at the forward end of forward section 52 mount the platform 48 for movement between the horizontal use and vertical storage positions indicated in FIGS. 2 and 3. Bracket members 62 affixed to the side walls 20 support the rear edge of forward section 52 while legs 64 normally stored in line with the rear edge of rear section 54 can be pivoted down to engage the floor 11 when the rear section 54 is extended as shown in solid lines in FIG. 3. When only a shallow depth shelf or platform is required the rear section 54 is pivoted forwardly on top of section 52 to the horizontal position shown in dotted lines at 54' in FIG. 3.

Figure 4:
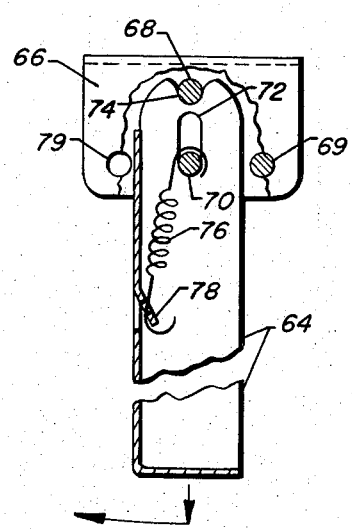
FIG. 4 is a front plan view of one of the support platform legs.
Figure 5:
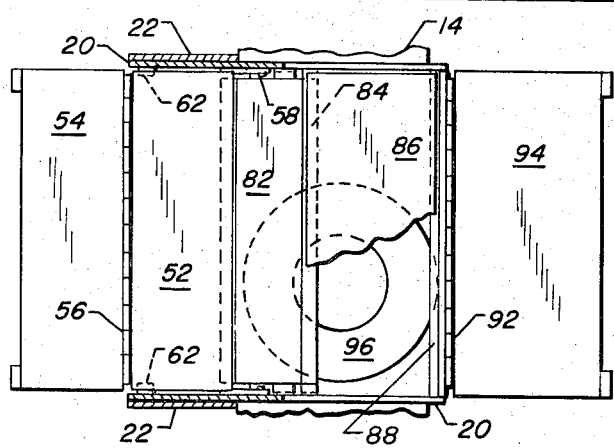
FIG. 5 is a fragmentary top plan view taken on line 5—5 of FIG. 3.

The details of the mechanism for mounting legs 64 for movement to and from their operative position is shown in FIG. 4. The mechanism includes a U-shaped bracket member 66 having a projecting flange (not shown) which may be attached by screws to the surface of the rear section 54. A pair of stop or alignment pins 68, 69 are fixedly mounted in the bracket 66 as is a pivot pin 70. A slot 72 in the leg 64 permits the leg to be pulled downwardly away from the bracket 66 so that the groove 74 in the upper end of the leg 64 will be disengaged from the upper pin 68 which locks it in its use position. The leg 64 can then be pivoted in a clockwise direction and released so that groove 74 engages alignment pin 69 to lock the leg in its storage position. The spring 76, which is tensioned between pivot pin 70 on the bracket 66 and a struck-out portion 78 on the leg 64, biases the groove 74 into engagement with either alignment pin 68 or alignment pin 69. Hole 79 in bracket 66 is an alternative location for alignment pin 69 and is used when it is desired to have the leg 64 swing to the right rather than to the left as shown in FIG. 4.

A fixed metal base member 82 having a forwardly extending flange 84 comprises the central portion of the flat support platform and separates the rearward portions from the forward portions. The base 82 is fastened to the side wall members 20 and cooperates with the upper cross members 28 and 30 to make the unit 10 rigid. A removable support shelf 86 is positioned forwardly of base member 82 so as to rest on flange 84 of base member 82 and also on flange 88 formed or vertical base member 90. The seat cushion 44 is hinged to base member 90 by a hinge 92 so that the underside 94 of cushion member 44 can be extended forwardly in the plane of the remainder of the support surface.

From the preceding description it will be obvious that the unit 10 can be used in several configurations with the rear platform 48 being positioned in three positions and the forward portion of the unit being usable either as a seat or as a support platform. When the seat-back member 38 is left in place and the seat 44 is folded forwardly the resulting support platform consisting of surfaces 86, 94 can be used for interior storage in the vehicle, as a play surface for children, or as a support for a large item such as a baby's crib or playpen. In all of the configurations of use the area under the base member 82 and under the removable support member 86 is available for storage of items such as the spare tire 96 for the vehicle.

We claim as our invention:

1. A convertible seat for a motor vehicle comprising a flat topped base portion; means for anchoring the base portion to the vehicle; a seating portion pivoted at its lower forward edge to the upper forward edge fo said base portion, said seating portion having an upper cushioned portion and an underneath flat bottom support surface adapted to be aligned with the flat top of said base portion when said upper cushioned portion is pivoted forwardly 180°, a seat back cushion adapted to be removably positioned in operative relation with said cushioned portion of said seating portion; a two section flat surfaced rear support means comprising a forward section and a rearward section hinged to each other, said rear support means being pivotally mounted along the forward edge of its forward section for movement between a generally vertical storage position behind said seat back cushion wherein said two sections are folded together and a horizontal position, means for selectively supporting said rear support means in a horizontal position with its rearward section folded against its forward section and means for selectively supporting said rear support means with its rearward section extended outwardly in a common plane with its forward portion and with said flat topped base portion.

2. A convertible seat in accordance with claim 1 wherein said seat back cushion has a shape complementary to said cushioned portion of said seating surface so that it is adapted to be stored under said cushioned portion when said cushioned portion is pivoted forwardly 180°.

3. A convertible seat in accordance with claim 1 wherein said seating portion and said rearward portion of said rear support means have folding leg members attached thereto for supporting said seating portion and said rearward portion in their extended positions.

4. A convertible seat in accordance with claim 1 wherein said base portion is supported at the ends of said seat by a pair of vertical support members, said vertical support members extending rearwardly and upwardly of said base portion and being connected at their upper top and forward edges to define a storage compartment behind said seat, the removal of said seat back cushion providing access to said compartment from the front of said seat and the selective vertical and horizontal positioning of said rear support means providing alternative storage configurations within said storage compartment independently of the position of the seating portion or of the seat back cushion.

5. A convertible seat and storage unit for a van type vehicle having rear doors and side mounted rear storage units fixedly mounted therein and spaced from each other by a distance no greater than the rear door opening clearance, said convertible seat and storage unit comprising a flat topped seat base portion and a flat bottomed seat cushion adapted to be alternately located between a seating use position on top of said seat base portion and a forward support platform position wherein the cushion is positioned upside down with its flat bottom in horizontal alignment with said seat base portion; a pivotable rear support platform selectively movable between a generally vertical storage position and a horizontal use position in alignment with said seat base portion; a pair of vertical side portions extending upwardly from said seat base portion; an upper support member connecting said vertical side portions; a seat back cushion removably connected to said upper support member, said seat back cushion being adapted to be selectively removed from its use position separating said rear support platform from said seat base portion to permit said front and rear support platforms to be used together or to be kept separate; and means for selectively mounting said convertible seat and storage unit to said fixed side storage units, said convertible seat and storage unit being removable through the rear doors of said vehicle when its presence is not required in the vehicle.

* * * * *